Dec. 3, 1968 A. E. HARROLD 3,414,682

DIGITAL DATA STORE FOR PULSE CODE TELEPHONE SIGNALLING

Filed Oct. 6, 1965 3 Sheets-Sheet 1

INVENTOR
ARTHUR EDWARD HARROLD
BY
Kirschstein, Kirschstein & Ottinger
ATTORNEYS

Dec. 3, 1968 A. E. HARROLD 3,414,682

DIGITAL DATA STORE FOR PULSE CODE TELEPHONE SIGNALLING

Filed Oct. 6, 1965 3 Sheets-Sheet 2

INVENTOR
ARTHUR EDWARD HARROLD
BY
Kirschstein, Kirschstein & Ottinger
ATTORNEYS

INVENTOR
ARTHUR EDWARD HARROLD
BY
[signature]
ATTORNEYS

United States Patent Office 3,414,682 Patented Dec. 3, 1968

3,414,682

DIGITAL DATA STORE FOR PULSE CODE TELEPHONE SIGNALLING

Arthur Edward Harrold, Hurworth-on-Tees, England, assignor to The General Electric Company Limited, London, England Filed Oct. 6, 1965, Ser. No. 493,580
Claims priority, application Great Britain, Oct. 6, 1964, 40,708/64
16 Claims. (Cl. 179—90)

ABSTRACT OF THE DISCLOSURE

A key-board type digital data store for use as a pulse code dialer. The buttons urge tensioned conductors into contact with another conducting element whereupon the conductor is latched in the "closed circuit" position. The tensioned conductors are arranged around the periphery of wafer type support members which are axially mounted and rotate with a center shaft. A tensioned conductor and its respective conducting element make up a switch that closes the path to program the pulse train generator to send out the respective number of pulses.

This invention relates to digital data stores.

The invention is particularly concerned with digital data stores of the kind in which data to be stored is entered by the selective manual operation of a plurality of push-buttons or other operating members.

Data stores of this kind are used, for example, in key sending equipments that are used in automatic telephone systems as an alternative to telephone dials.

It is an object of the present invention to provide an improved digital data store of the kind of specified above.

According to one aspect of the present invention in a digital data store having a push-button which is operable to enter a digital value into the store, an elongated resilient electrical conductor lies adjacent to but normally spaced from an electrically conducting member, the arrangement being such that upon operation of said push-button said conductor is displaced and latched at a position in which the energy stored in said conductor by its displacement urges it into electrical contact with said electrically conducting member.

According to another aspect of the present invention in a digital data store having a plurality of push-buttons each operable to enter a different digital value into the store, a plurality of elongated resilient electrical conductors lie adjacent to but normally spaced from a plurality of electrically conducting members which are respectively associated with said plurality of push-buttons the arrangement being such that upon each of a succession of operations of said push-buttons one of said conductors is displaced and latched at a position in which the energy stored in said one of said conductors by its displacement urges it into electrical contact with the electrically conducting member associated with the operated push-button, the conductor that is so displaced being different for each of said succession of operations of said push-buttons.

One embodiment of a digital data store in accordance with the present invention will now be described, by way of example, with reference to the three figures of the accompanying drawings in which.

The data store to be described forms part of key-sending equipment for an automatic telephone system and has ten digit registers each adapted, as will be hereinafter described, to store any one of the decimal digit values one to ten and ten push-buttons each operable manually to enter a different one of these digit values into the digit registers.

Figure 1:
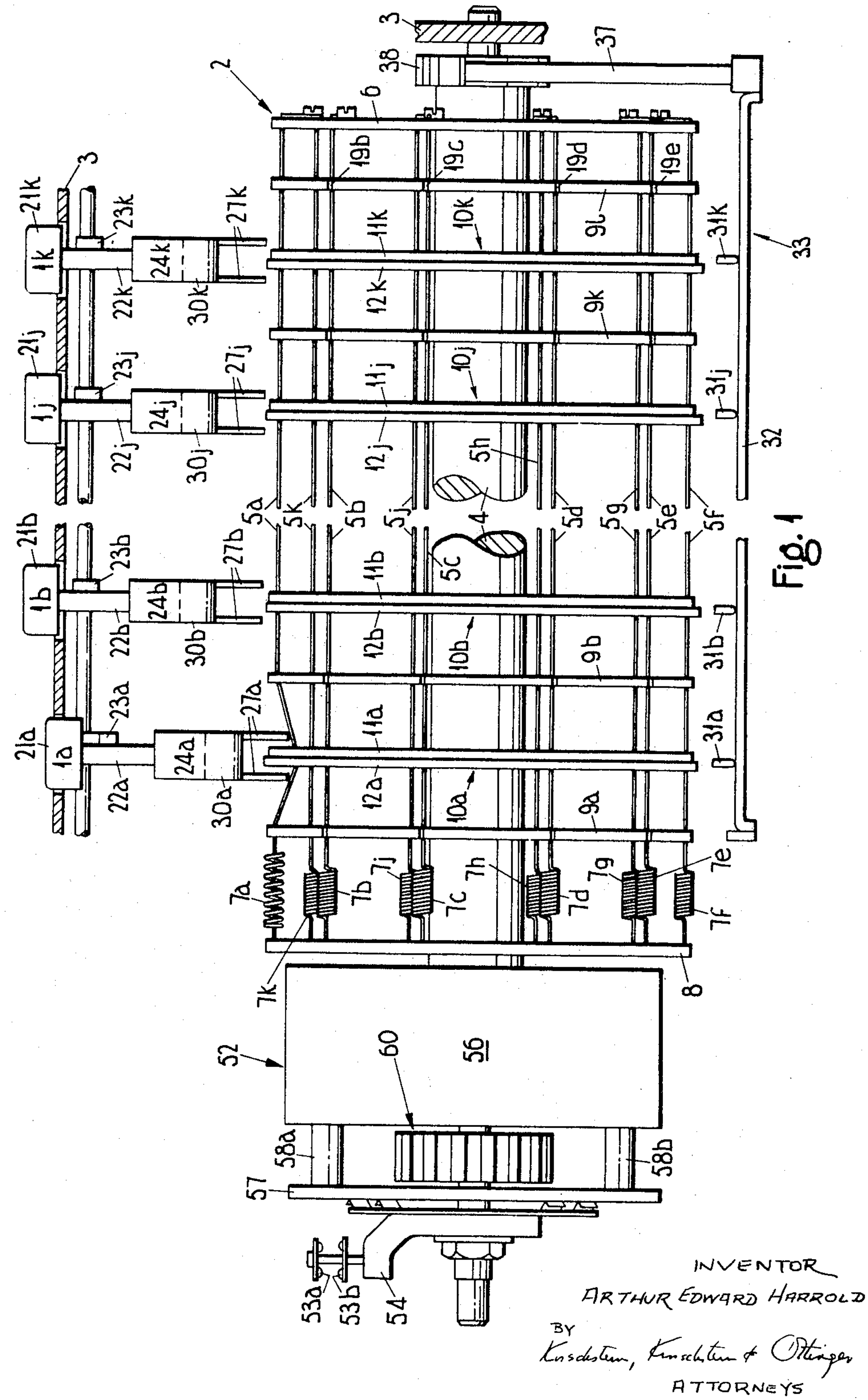
FIGURE 1 shows a side elevation of part of the data store
Figure 2:
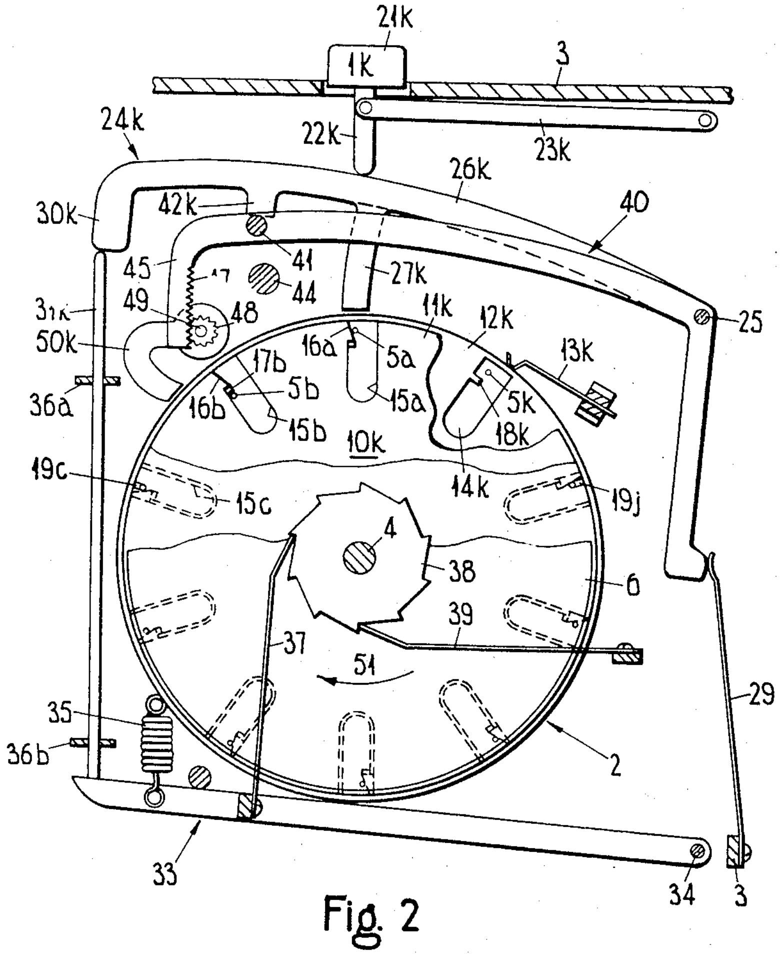
FIGURE 2 shows an end elevation, partly in section, of the data store.

Referring to FIGURES 1 and 2, only the push-buttons 1*a*, 1*b*, 1*j* and 1*k* are shown that are for entering the decimal digit values one, two, nine and ten respectively. The ten digit registers are incorporated in a rotatable assembly 2 which is supported by a casing 3 of the data store and which includes a rotatable shaft 4 and ten electrically conducting wires 5 that belong to the ten digit registers respectively.

Each wire 5 has one end fixed to a disc 6 of electrical insulating material and has its other end connected to an individual tension spring 7 which is fixed to another disc 8 of electrical insulating material. The discs 6 and 8 are attached to and are coaxial with the shaft 4. Also attached to the shaft 4 are eleven indentical spacer discs 9 and ten identical disc assemblies 10 which alternate with these spacer discs along the shaft between the discs 6 and 8.

Each disc assembly 10 comprises an electrically insulating disc 11 attached to the shaft 4 and an annular metal plate 12 carried by this disc 11, the disc 11 and the plate 12 being coaxial with the shaft 4. The plate 12 has a slightly larger diameter than the disc 11 and its periphery is engaged in all angular positions of the shaft 4 by an associated one of ten wipers 13 carried by the casing 3. Ten radial apertures 14 are regularly spaced around the plate 12 and ten radial slots 15 are regularly spaced around the periphery of the disc 11. Wedge-shaped portions 16 of the discs 11 project into the slots 15 so as to provide a step 17 in one side of each slot. The slots 15 correspond in position to the apertures 14 but are slightly smaller in size so that their edges generally overlap the edges of the apertures. However lug portions 18 of the plate 12 project into the apertures 14 so as to be slightly proud of the disc 11 along the edge of each wedge-shaped portion 16 that comprises the step 17.

Each spacer disc 9 has ten shallow indentations 19 regularly spaced around its periphery. The wires 5 rest in and are located by these indentations 19 so as normally to be maintained at a generally uniform spacing from the shaft 4 throughout their lengths. The wires 5 also pass through the apertures 14 and the slots 15 of the disc assemblies 10. These assemblies 10 are orientated with respect to the spacer discs 9 so that normally each wire 5 abuts the inclined edge of one wedge-shaped portion 16 of each disc assembly 10 and so that any wire 5 which is displaced towards the shaft 4 and beyond the step 17 provided by any one of the associated wedge-shaped portions 16 will be latched under that step.

Each push-button 1 comprises a head portion 21 situated in an aperture through the casing 3 and a shank portion 22 within this casing. An individual link 23 is pivotally attached at one end to the shank portion 22 and at the other end to the casing. This link 23 serves both to locate the push-button 1 and to limit upward movement of that push-button by its engagement of the casing 3.

Ten cranked levers 24 are associated with the ten push-buttons 1 respectively and are pivotally mounted on a common spindle 25 so that each lever is able to turn independently of the other nine. The shank portion 22 of each push-button 1 has its free end resting on one arm 26 of the associated lever 24. This arm 26 carries a pair of spaced tongues 27 which extend downwardly towards the rotatable assembly 2. The other arm of this lever 24 is engaged by an associated one of a row of twelve leaf springs 29 which are carried by the casing 3 and ten of which act through the ten levers 24 respectively normally to maintain each push-button 1 in the position illustrated with the links 23 abuting the casing 3.

The end portion 30 of each arm 26 is bent downwards through about a right-angle and abuts one end of an associated one of ten rods 31 which have their other ends resting on a cross-piece 32 of a pivoted frame 33. This frame 33 is mounted on a spindle 34 carried by the casing 3 and is urged by a coiled spring 35 to maintain the rods 31 in engagement with the levers 24. The rods 31 pass freely through apertures in a pair of spaced guide bars 36 attached to the casing 3. A pawl 37 is attached to the frame 33 and cooperates with a ratchet wheel 38 attached to one end of the shaft 4. A detent 39 also co-operates with this ratchet wheel 38 which has ten teeth regularly spaced around its periphery. The detent 39 is supported by the casing 3.

Two further cranked levers 40 are pivotally mounted on the two ends respectively of the spindle 25 and have a bar 41 extending between them beneath downward projections 42 on the arms 26 of the cranked levers 24. The two leaf springs 29 at each end of the row act on the levers 40 to maintain engagements between the bar 41 and the projections 42 on the levers 40. A stop bar 44 extends between the ends of the casing 3 beneath the levers 40 and serves to limit downward movement of these levers and hence of the levers 24 and the push-buttons 1.

The end portion 45 of one arm of each lever 40 is bent downward through about a right angle and is provided with teeth so as to form a rack 47. These racks 47 co-operate with pinion wheels 48 which are fixed to a rotatable spindle 49 supported by the casing 3. Ten pairs of identical hook-shaped members 50 are fixed to the spindle 49 so as to rotate with that spindle. The two members 50 of each pair are positioned on the spindle so as to be adjacent to the two sides respectively of a different one of the disc assemblies 10.

Normally the rotatable assembly 2 is positioned by means of the detent 39 and the ratchet wheel 38 so that one of the ten wires 5 is immediately under the ends of the pairs of tongues 27 carried by the cranked levers 24. The wire **5*a* is shown in this position. When it is required to enter any decimal digit value the appropriate push-button 1 is operated. For example, the push-button 1*k* is pushed downwards manually causing the levers 24*k* and 40 to turn about the spindle 25 until the levers 40 engage the stop bar 44**.

The rotation of the levers 40 produces rotation of the spindle 49 and the hook-shaped members 50 by means of the racks 47 and the pinion wheels 48. Thus each pair of the members 50 moves across opposite sides of a different one of the disc assemblies 10. Normally the ends of any pair of these members pass freely beneath the wire **5*b* but will engage this wire if it is latched by their associated one of the disc assemblies 10 and then will displace this wire from beneath the step 17 where it is latched and so permit the energy stored in the associated spring 7*b*** to restore this wire to its normal position.

The rotation of the lever **24*k* results in its pair of tongues 27*k* passing down either side of the disc assembly 10*k* which is associated with the operated push-button 1*k*. The ends of these tongues 27*k* engage the wire 5*a* causing the portion of this wire between the spacer discs 9*k* and 9*l* to be displaced towards the shaft 4 so that it is latched beneath the associated step 17 of the disc assembly 10*k*. Energy stored in the spring 7*a* by this displacement urges the wire into intimate electrical contact with the lug portion 18 of the plate 12*a* that is provided with this step 17. Thus an electric circuit is completed between the wire 5*a* and the wiper 13*k* that is characteristic of the operated push-button 1*k***.

The movement of the end portion **30*k* of the arm 26*k* which also results from the rotation of the lever 24*k* produces displacement of the pivoted frame 33 through the rod 31*k*. The amount of the corresponding displacement of the pawl 37 is such that this pawl engages the next tooth round the ratchet wheel 38 in an anticlockwise direction having regard to FIGURE 2. Consequently, when the operated push-button 1*k* is released, the springs 35 acting on the pivoted frame 33 cause the pawl 37 to turn the ratchet wheel 38 and the rotatable assembly 2 one tenth of a revolution in the direction indicated by the arrow 51 and thereby bring the wire 5*b* to the position previously occupied by the wire 5*a*. Also the cranked levers 24*k* and 40 and the push-button 1*k* are returned to their normal positions and the hook-shaped members 50 are withdrawn from the rotatable assembly 2**.

Upon the next operation of any one of the push-buttons 1 a portion of the wire **5*b* is displaced by the tongues 27 on the lever 24 associated with this push-button so as to be latched by the disc assembly 10 associated with this push-button and the hook-shaped members 50 unlatch any latched portion of the wire 5*c*. When this operated push-button 1 is released the rotatable assembly 2 is turned through one tenth of a revolution to bring the wire 5*c* underneath the tongues 27 of the levers 24 for storing the next digit value to be entered by operating one of the push-buttons 1**.

Although in the data store described above each push-button 1 is adapted to produce the displacement and latching of a different one of ten portions of any wire 5 then situated beneath the tongues 27 this is not essential and some at least of the push-buttons 1 could be adapted each to produce the displacement and latching of a unique combination of portions of such a wire. This would enable fewer disc assemblies 10 and spacer discs 9 to be provided in the rotatable assembly 2.

Figure 3:
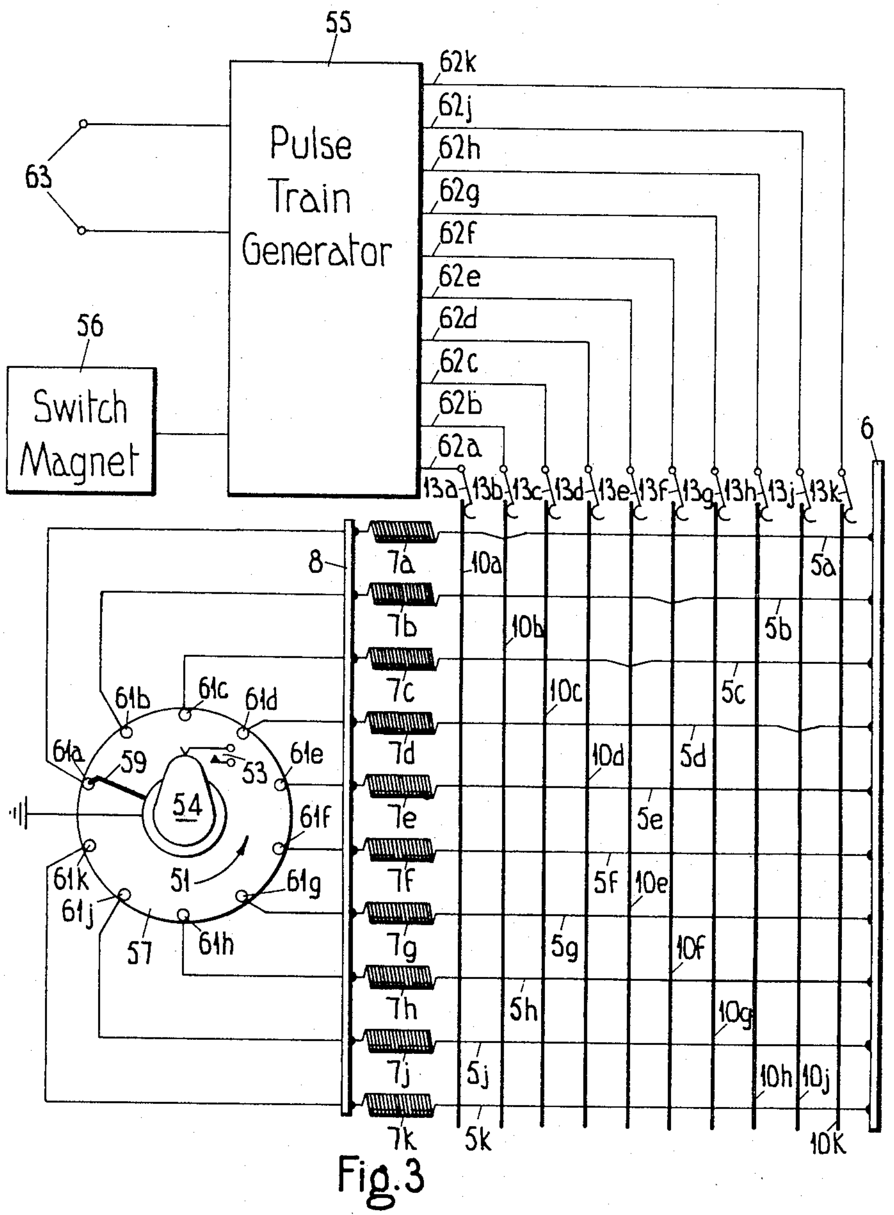
FIGURE 3 shows diagrammatically key sending equipment incorporating the data store.

The key-sending equipment of which the data store forms part also includes a rotary switch 52, a pair of electric contact springs 53 and a control cam 54 all of which are shown in FIGURE 1, and an electric pulse train generator 55 that is represented diagrammatically in FIGURE 3 to which reference should now also be made. The switch 52 is attached to and rotates with the shaft 4 and comprises an electromagnet 56, a circular contact plate 57 of insulating material supported by pillars 58, a wiper 59 and a pawl and ratchet mechanism 60 operable by the electromagnet 56 to rotate the wiper 59 relative to the contact plate 57 and in the opposite direction to the direction of rotation 51 of the shaft 4. The cam 54 rotates with the wiper 59 and is arranged to permit the relatively fixed contact springs **53*a* and 53*b*** to engage in all but one of ten possible angular positions of this wiper.

The contact plate 57 has ten electric contacts 61 regularly spaced around it and connected electrically to the ten wires 5 respectively. Thus each of the contacts 61 corresponds to a different one of the ten digit register of the data store. The wiper 59 is connected electrically to the casing 3 which is earthed.

The pulse train generator 55 has ten input leads 62 which correspond to the digit values one to ten respectively, and two output terminals 63 for connection to the line wires (not shown) of a telephone line. This generator 55 is operable only when the contact springs **53*a* and 53*b* are engaged and is arranged so that when it is operable and any particular one of the input leads 62 is earthed it supplies to the output terminals 63 a number of electric pulses between one and ten that is characteristic of the digit value corresponding to this earthed input lead. Such pulses are supplied to the output terminals 63 at the conventional repetition rate for dial pulses in automatic telephone systems of ten per second. The generator 55 also controls the electromagnet 56 and hence the wiper 59 by supplying an electric current pulse to this electromagnet, after a delay of about 400 milliseconds following the supply to the output terminals 63** of each series of pulses characterising a digit value.

The ten input leads 62 of the generator 55 are connected to the ten wipers 13 respectively which engage the peripheries of the plates 12 of the disc assemblies 10. The disc assembly 10 corresponding to any particular one of the ten digit values has its wiper 13 connected to the input lead 62 that corresponds to the same one of these digit values.

Normally, the contact springs 53 are held apart by the cam 54 so that the generator 55 is inoperative, and the wiper 59 of the switch 52 is engaging the particular one of the contacts 61 of the contact plate 57 that is associated with the next digit register in which a digit value can be entered. If now the push-buttons 1 corresponding to the values of the digits of a telephone number are operated in the order of those digits in that number, these digit values are entered in consecutive digit registers round the rotatable assembly 2 in the manner already described and this assembly is turned through one tenth of a revolution for each digit.

Upon the operation of one of the push-buttons, for example the push-button 1*b*, to enter the first of these digit values the wire 5*a* is displaced and then latched by the disc assembly 10*b* associated with this push-button so that earth potential on the wiper 59 is applied via the wire 5*a*, the disc assembly 10*b* and the wiper 13*b* to the input lead 62*b* of the generator 55 which is inoperative at this time. As the assembly 2 rotates upon the restoration of the operated push-button 1*b* the cam 54 disengages the contact spring 53*a* which therefore engages the contact spring 53*b*. This enables the generator 55 to supply a number of pulses to the output terminals 63 corresponding to this first digit value.

After the delay of about 400 milliseconds the generator 55 supplies an energising pulse to the electromagnet 56. Consequently the wiper 59 is moved from the contact 61*a* to the contact 61*b* and the cam 54 is moved one step back towards the position in which it opens the contact springs 53. The cam 54 will open the contact springs 53 to inhibit the generator 55 only if no further digit value has been entered into the data store at this time. This situation will not usually arise as the digit values can be entered at a quicker rate than the corresponding series of pulses can be supplied to the terminals 63. It is unlikely, however, that all the digit values of the telephone number will have been entered at this time. This means that although only ten digit registers are provided it is possible to use the key-sending equipment for telephone numbers having more than ten digits without operating the push-buttons 1 at a slower rate than normal.

The wiper 59, in moving to the contact 61*b*, selects the wire 5*b* of the digit register that, it will be assumed, is now storing the second digit value of the telephone number. As the contact springs 53 are closed the generator 55 sends out the series of pulses to the terminals 63 that represents this second digit value. Then, after the delay of about 400 milliseconds, the wiper 59 is moved into engagement with the contact 61*c* to select the wire 5*c* of the digit register which is storing the third digit of the telephone number. The cam 54 of course, moves with the wiper 59. This sequence continues until eventually the series of pulses representing the last digit value of the telephone number is sent out. Then, after the 400 millisecond delay, the wiper 59 is moved to select the wire 5 of that one of the digit registers in which no digit value is stored and the cam 54 opens the contact springs 53 to inhibit the generator 55.

The key-sending equipment described above may be provided with a "cancel" key (not shown) which when operated causes the generator 55 to supply energising pulses to the electromagnet 56 until the cam 54 opens the contact springs 53. Such a cancel key enables incorrectly entered telephone numbers to be cleared from the data store.

I claim:

1. A digital data store comprising a pair of spaced support members, an elongated resilient electrical conductor extending between the support members, an electrical conducting member which is adjacent to but normally spaced from a portion of said conductor, push-button means which is operable manually to displace the conductor portion transversely of the conductor length to a predetermined position for the purpose of entering a digital value into the store, and latching means forming part of said conducting member to engage and retain said conductor portion in said predetermined position when said push-button means is released after having been operated and thereby obtain an electrical connection between said conductor and said conducting member.

2. A digital data store comprising a pair of spaced support members, an elongated resilient electrical conductor extending between the support members, a plurality of spaced electrical conducting members which are adjacent to but normally spaced from a plurality of portions respectively of said conductor, a plurality of push-button means which are operable manually to displace selectively the conductor portions transversely of the conductor length and each to a predetermined position for the purpose of entering a plurality of different digital values respectively into the store, and a plurality of latching means which each forms part of a different one of said conducting members and which each is to engage and retain the associated conductor portion in its predetermined position when the push-button means is released that is operated to displace that conductor portion to that position.

3. A digital data store according to claim 2 wherein each of said push-button means is adapted to displace a different one of the conductor portions to its predetermined position.

4. A digital data store according to claim 2 wherein said conductor comprises an electrically conducting wire and a coiled spring connected to one end of that wire.

5. A digital data store according to claim 2 wherein a plurality of locating members are interposed with said conducting members to locate and support said conductor at a plurality of positions in its length so that the displacement of that conductor from a normal position thereof that is produced by the operation of any one of said push-button means is confined to a length of that conductor between an adjacent pair of these locating members.

6. A digital data store according to claim 5 wherein said conductor extends through alined openings in said conducting members and wherein each conducting member has a portion projecting into its opening to engage and retain the associated portion of said conductor in its predetermined position, these portions of said conducting members comprising said latching means.

7. A digital data store according to claim 6 wherein a plurality of electrical insulating members abut the plurality of conducting members and have alined apertures through which said conductor extends and which are shaped to prevent electrical engagement between that conductor and all but the projecting portions of the conducting members.

8. A digital data store according to claim 7 wherein each said insulating member has a wedge-shaped portion projecting into its aperture to guide the associated conductor portion to its predetermined position during its displacement by an operated pushbutton means.

9. A digital data store comprising a pair of spaced support members, a plurality of elongated resilient electrical conductors extending between the support members, a plurality of spaced electrical conducting members which are adjacent to but normally spaced from a plurality of portions respectively of each said conductor, a plurality of push-button means each of which is operable manually to displace to a predetermined position a different one of the portions of any one of the said conductors that then has a predetermined positional relationship with these push-button means, drive means to produce relative movement between said push-button means and said conductors so as to obtain said predetermined positional relationship between said push-button means and one of said conductors at a time, and a plurality of latching means which comprise parts of said conducting members and each of which is to engage and retain an associated one of the conductor portions in its predetermined position when the push-button means is released that is operated to displace that conductor portion to that position.

10. A digital data store according to claim 9 wherein coupling means provides mechanical coupling between said push-button means and said drive means whereby said predetermined positional relationship is obtained between said push-button means and a different one of said conductors as the result of each of a succession of operations of the push-button means.

11. A digital data store according to claim 10 wherein a shaft carries a rotatable assembly comprising said support members, said conductors and said conducting members and wherein said drive means is adapted to produce a rotation of this assembly.

12. A digital data store according to claim 11 wherein said conducting members are circular and coaxial with said shaft; said conductors are parallel to and at a regular spacing around that shaft; and a plurality of electric wipers co-operate with the peripheries of said conducting members.

13. A digital data store according to claim 11 wherein unlatching means is provided to unlatch any latched conductor portion after a predetermined number of operations of said push-button means following that which resulted in the latching of this conductor portion.

14. A digital data store according to claim 13 wherein further coupling means provides mechanical coupling between said push-button means and said unlatching means whereby said unlatching means is actuated as the result of each operation of the push-button means to unlatch any latched portion of any one of said conductors that then has a further predetermined positional relationship with said push-button means.

15. A digital data store according to claim 9 wherein each said conductor is constituted partly at one end by an individual coiled spring and is fixed at each end to said support members so that when any said portion of the conductor is displaced as aforesaid this spring stores energy to urge this conductor portion into electrical contact with its associated conducting member.

16. A digital data store which is according to claim 9 and which stores the digital values of a telephone number that are entered sequentially by the selective operation of said push-button means, in combination with switching means operable to select in a corresponding sequence the conductors having portions displaced as aforesaid to store these digital values and signalling means which has an output circuit connectable to line wires of a telephone line and which is to supply electric signals to this output circuit that characterise in a predetermined manner the digital value stored by any one of said conductors that is selected by said switching means.

No references cited.

KATHLEEN H. CLAFFY, *Primary Examiner.*

A. H. GESS, *Assistant Examiner.*